United States Patent
Quinn et al.

(10) Patent No.: US 7,359,974 B1
(45) Date of Patent: Apr. 15, 2008

(54) SYSTEM AND METHOD FOR DYNAMICALLY CONTROLLING AGGREGATE AND INDIVIDUAL PACKET FLOW CHARACTERISTICS WITHIN A COMPRESSED LOGICAL DATA TUNNEL

(75) Inventors: Michael J. Quinn, Campbell, CA (US); Mary Laier, Cupertino, CA (US)

(73) Assignee: Packeteer, Inc., Cupertino, CA (US)

( * ) Notice: Subject to any disclaimer, the term of this patent is extended or adjusted under 35 U.S.C. 154(b) by 849 days.

(21) Appl. No.: 10/112,577

(22) Filed: Mar. 29, 2002

(51) Int. Cl.
*G06F 15/16* (2006.01)
*G08C 15/00* (2006.01)
*H04J 3/16* (2006.01)

(52) U.S. Cl. .................. 709/228; 709/231; 709/232; 709/234

(58) Field of Classification Search .......... 709/247, 709/224, 226, 232, 233, 234, 235, 228, 220, 709/231, 236; 370/468, 229, 316, 238.1
See application file for complete search history.

(56) References Cited

U.S. PATENT DOCUMENTS

| | | | | |
|---|---|---|---|---|
| 5,768,535 A | * | 6/1998 | Chaddha et al. ............ 709/247 |
| 5,926,647 A | * | 7/1999 | Adams et al. ................ 712/36 |
| 6,020,931 A | * | 2/2000 | Bilbrey et al. .............. 348/584 |
| 6,181,711 B1 | * | 1/2001 | Zhang et al. ................ 370/468 |
| 6,388,584 B1 | * | 5/2002 | Dorward et al. .............. 341/51 |
| 6,598,034 B1 | * | 7/2003 | Kloth .......................... 706/47 |
| 6,640,238 B1 | * | 10/2003 | Bowman-Amuah ......... 709/201 |
| 6,859,442 B1 | * | 2/2005 | Agarwal et al. ............ 370/316 |
| 6,934,752 B1 | * | 8/2005 | Gubbi ........................ 709/225 |
| 6,937,566 B1 | * | 8/2005 | Forslow ...................... 370/231 |
| 2002/0026503 A1 | * | 2/2002 | Bendinelli et al. .......... 709/220 |
| 2003/0126233 A1 | * | 7/2003 | Bryers et al. ............... 709/219 |

OTHER PUBLICATIONS

Shacham A., et al., "IP Payload Compression Protocol," 1998, 8 pps., RFC, http://www.fags.org/rfc2393.html, USA.
Stevens WR, "TCP/IP Illustrated vol. 1," Ch. 1-3, 1994, p. 1-51, Addison Wesley Longman, Inc., Redding, Massachusetts, USA.

* cited by examiner

*Primary Examiner*—Saleh Najjar
*Assistant Examiner*—Vitali Korobov
(74) *Attorney, Agent, or Firm*—Mark J. Spolyar

(57) ABSTRACT

A system and method for dynamically controlling aggregate and individual packet flow characteristics within a compressed logical data tunnel. A logical data tunnel is formed and includes one or more packet flows. Each packet flow includes individual packets having a shared destination address. Bandwidth allocated to control an aggregated flow of packets routed through the logical data tunnel. A transfer rate is assigned to control each packet flow transiting within the logical data tunnel.

13 Claims, 16 Drawing Sheets

190

SYSTEM AND METHOD FOR DYNAMICALLY CONTROLLING AGGREGATE AND INDIVIDUAL PACKET FLOW CHARACTERISTICS WITHIN A COMPRESSED LOGICAL DATA TUNNEL

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates in general to packet flow control and, in particular, to a system and method for dynamically controlling aggregate and individual packet flow characteristics within a compressed logical data tunnel.

BACKGROUND OF THE INVENTION

Distributed networking environments, such as enterprise computing environments, generally consist of individual interconnected subnetworks. These subnetworks include intranetworks physically defined within a geographically limited area, such as within an office building, and internetworks, including the Internet, physically defined over a geographically distributed area using private and leased terrestrial lines and via satellite communications links.

Commonly, both intranetworks and internetworks operate in accordance with the ISO/OSI open interconnect model, an international network protocol definition, which specifies seven hierarchically-related network layers for use in digital data exchange. The Transmission Control Protocol/Internet Protocol (TCP/IP) standard defines a complementary layered network protocol, which simplifies the ISO/OSI interconnection model. TCP/IP is described in W. R. Stevens, "TCP/IP Illustrated, Vol. 1, The Protocols," Chs. 1-3, Addison Wesley (1994), the disclosure of which is incorporated by reference.

TCP/IP is a layered network protocol framework and specifies media access, link, network, transport, and application protocol layers. The link and network layers define point-to-point protocols and the transport and application layers define end-to-end protocols. Applications executing within the application layer exchange packets containing source and destination addresses to identify originating and receiving hosts. The remaining network protocol layers facilitate the physical and logical transport of each packet.

The flow of packets can be controlled during transit to accommodate available network bandwidth and rate capabilities. A traffic manager can be co-located at a network domain boundary to monitor and analyze transient packet traffic for use in traffic analysis and flow control. Traffic managers primarily optimize throughput through bandwidth and rate control applied to internetwork connections, which are more costly yet slower than intranetwork connections.

Throughput optimization is particularly important in a high-traffic environment, such as a corporation, university, or Internet service provider. Unmanaged network traffic, particularly at the application network layer, hampers efficient throughput utilization and can result in bandwidth lost to non-core network traffic. Traffic managers can address application network layer throughput by prioritizing traffic according to user-specified network policies to ensure network availability for core network traffic needs.

Certain network protocols make throughput optimization difficult. The Transmission Control Protocol (TCP), for instance, provides end-to-end connectivity between origin and destination hosts. TCP is used by application layer protocols, such as the Hypertext Transport Protocol (HTTP), to exchange information between application programs. TCP is greedy and consumes available bandwidth. A TCP connection will initially send one packet, followed by two packets, and so on, to incrementally increase the packet rate until no further gains are realized. Unmanaged TCP connections can dominate traffic flow and monopolize available bandwidth.

Data compression can increase total utilization of bandwidth, but does not stop the greedy nature of TCP/IP connections. Data compression can be combined with rate control to meter the pace at which packet traffic flows over a network. Rate control helps to alleviate bottlenecks and controls greedy flows by managing per-flow bandwidth while data compression allows smaller packets to be sent, thereby conserving available network bandwidth. This marriage of the two functions allows per-flow and aggregate management of bandwidth with visibility into the effects of the compressions.

In the prior art, data compression has been used as the principal means to increase bandwidth utilization. However, prior art data compression solutions fail to control flow rates entering into a compressed stream of data and fail to provide means for changing or removing data compression midflow. In addition, when used in conjunction with non-integrated bandwidth management solutions, prior art data compression solutions are unable to completely utilize the bandwidth available on a datalink over which traffic is classified.

Therefore, there is a need for an approach to providing an integrated solution that provides packet flow management controlling both aggregate and per-flow bandwidth in concert with data compression to optimize the throughput and utilization of a datalink.

There is a further need for an approach to shaping packet traffic exchanged between end-to-end hosts. Preferably, such an approach would allow the traffic streams to be controlled collectively and individually.

There is a further need for an approach to providing flexible and granular data compression on per-flow, per-service and multiple shared-service bases. Preferably, such an approach would allow the form of data compression to be changed or eliminated midflow.

SUMMARY OF THE INVENTION

The present invention provides a system and method for managing incoming and outgoing packet traffic exchanged between logically-configured tunnel partners. The packet traffic is managed in a large-grained fashion by bandwidth limiting an aggregate of one or more packet flows transiting a logical data tunnel. Bandwidth limits are assigned to groups of packet flows and operate on compressed packet sizes. The packet traffic is managed in a fine-grained fashion by rate limiting individual packet flows within the logical data tunnel. Rate limits are provided through management of packet transmission based on uncompressed data sizes. The data compression is selected based on the service classification of each packet and is applied on a per-flow, per-service, or multiple shared-service basis. Since data compression is performed on a per-packet basis, the form of data compression used can be changed in midflow.

An embodiment provides a system and method for dynamically controlling aggregate and individual packet flow characteristics within a compressed logical data tunnel. A logical data tunnel is formed and includes one or more packet flows. Each packet flow includes individual packets having a shared destination address. Bandwidth allocated to control an aggregated flow of packets routed through the logical data tunnel. A transfer rate is assigned to control each packet flow transiting within the logical data tunnel.

A further embodiment provides a system and method for managing packet flow through a logical data tunnel formed between partnered traffic managers. Outgoing packets are sent to a partnered traffic manager via a logical data tunnel. The logical data tunnel includes one or more packet flows transiting to the partnered traffic manager. A packet rate of each packet flow through data compression is controlled. Each packet flow includes a substantially continuous stream of packets flowing to the partnered traffic manager. Bandwidth allocated to the packet flows in the logical data tunnel is limited by analyzing aggregated packet flows. Incoming packets from the partnered traffic manager are received via the logical data tunnel. The packet rate of each packet flow is controlled through an input queue transiently storing each incoming packet.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
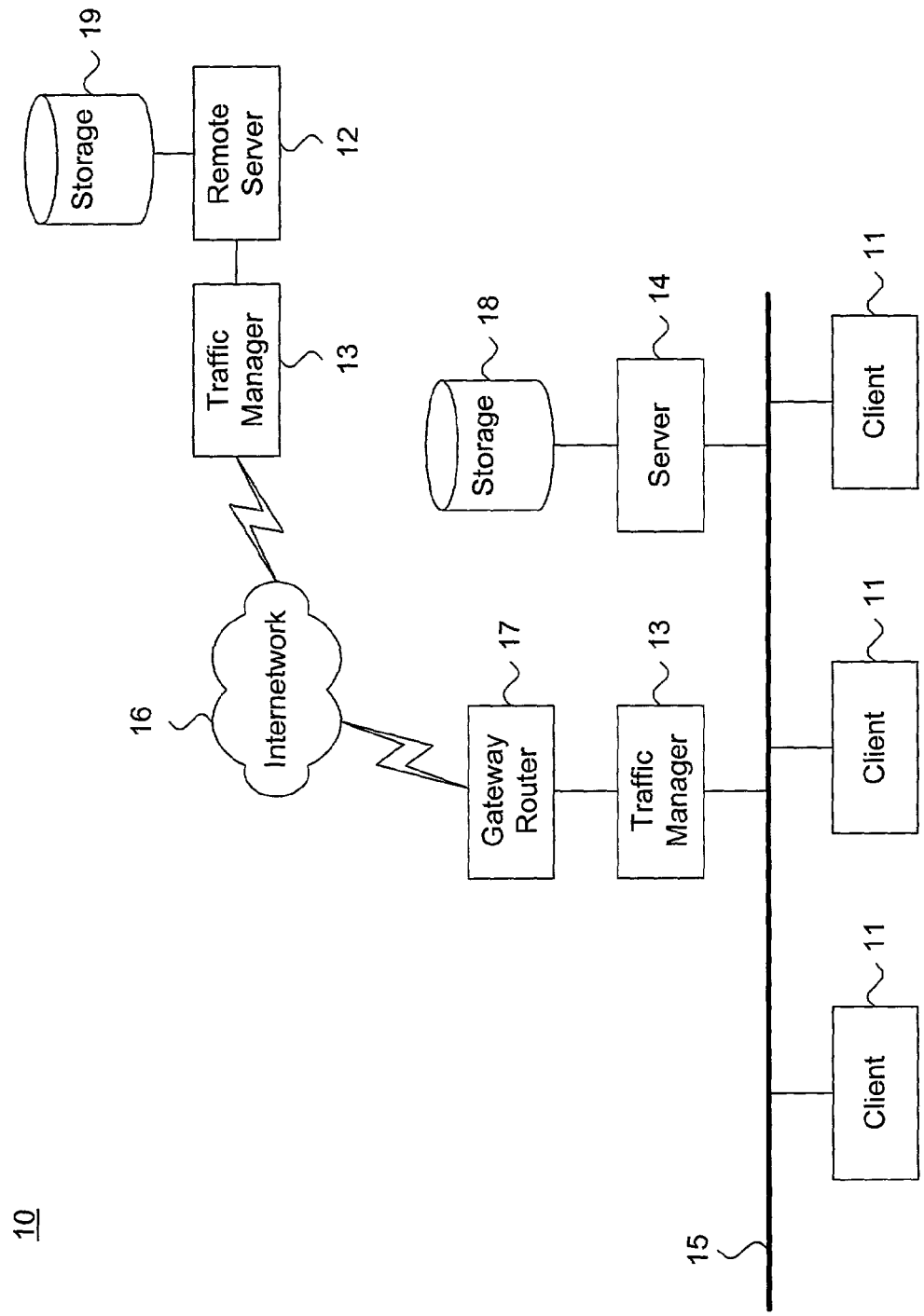
FIG. 1 is a functional block diagram showing a distributed networking environment, including a system for dynamically controlling aggregate and individual packet flow characteristics within a compressed logical data tunnel, in accordance with the present invention.

FIG. 1 is a functional block diagram showing a distributed networking environment 10, including a system for dynamically controlling aggregate and individual packet flow characteristics within a compressed logical data tunnel, in accordance with the present invention. Network packets are exchanged between individual clients 11 and a remote server 12 to access information stored in a storage device 19 via an internetwork 16. The individual clients are interconnected via an intranetwork 15, which is interfaced to the internetwork 16 via a gateway router 17 or similar packet routing device. Alternatively, the client 11 interfaces locally to a server 14 via an intranetwork 15 to access information stored in a storage device 18.

To facilitate packet flow, a pair of partnered traffic managers 13 is communicatively interposed between the internet 16, the intranetwork 15, and the remote server 12. The traffic managers 13 work cooperatively to control dynamically aggregate and individual packet flow characteristics within a logically formed data tunnel, as further described below beginning with reference to FIG. 3. The traffic managers 13 provide rate-limiting control on a per-flow basis and bandwidth-limiting control on an aggregate basis.

Other network topologies and configurations, as well as various combinations thereof, are feasible, as would be recognized by one skilled in the art. The individual computer systems, including servers and clients, are general purpose, programmed digital computing devices consisting of a central processing unit (CPU), random access memory (RAM), non-volatile secondary storage, such as a hard drive or CD ROM drive, network interfaces, and peripheral devices, including user interfacing means, such as a keyboard and display. Program code, including software programs and data, are loaded into the RAM for execution and processing by the CPU and results are generated for display, output, transmittal, or storage.

Figure 2:
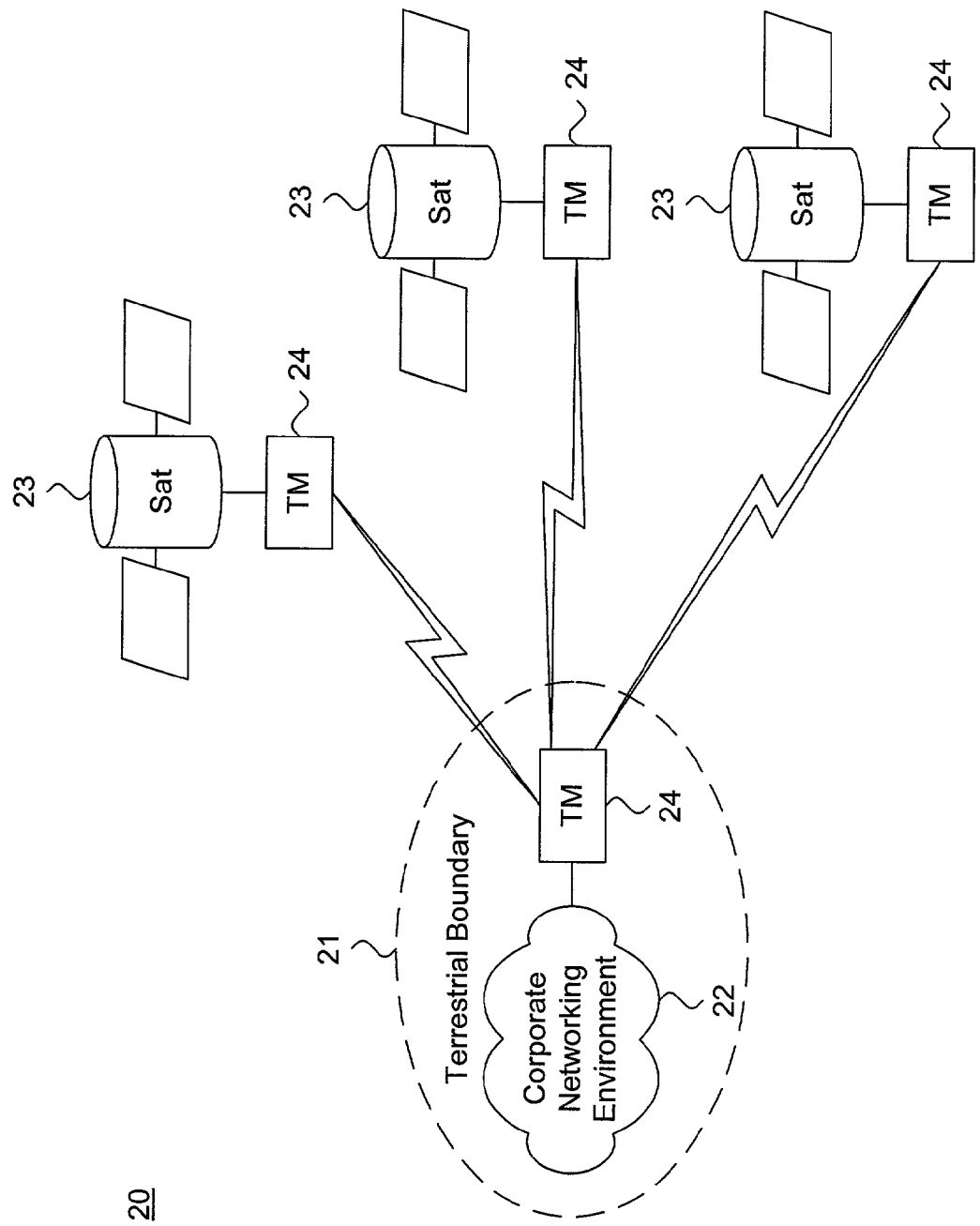
FIG. 2 is a functional block diagram showing a distributed networking environment, in accordance with a further embodiment of the present invention.

FIG. 2 is a functional block diagram showing a distributed networking environment 20, in accordance with a further embodiment of the present invention. A terrestrial corporate networking environment 22 operates within a terrestrial boundary 21. The environment includes distributed networking environments, such as environment 10, described above. The corporate networking environment 22 interfaces to one or more satellite-based communication systems 23 via pairs of partnered traffic managers (TM) 24 communicatively interposed between each satellite 23 and the corporate networking environment 22. The pairing of traffic managers 24 allows the formation of logical data tunnels which can be dedicated to a specific set of inbound and outbound packet flows.

Figure 3:
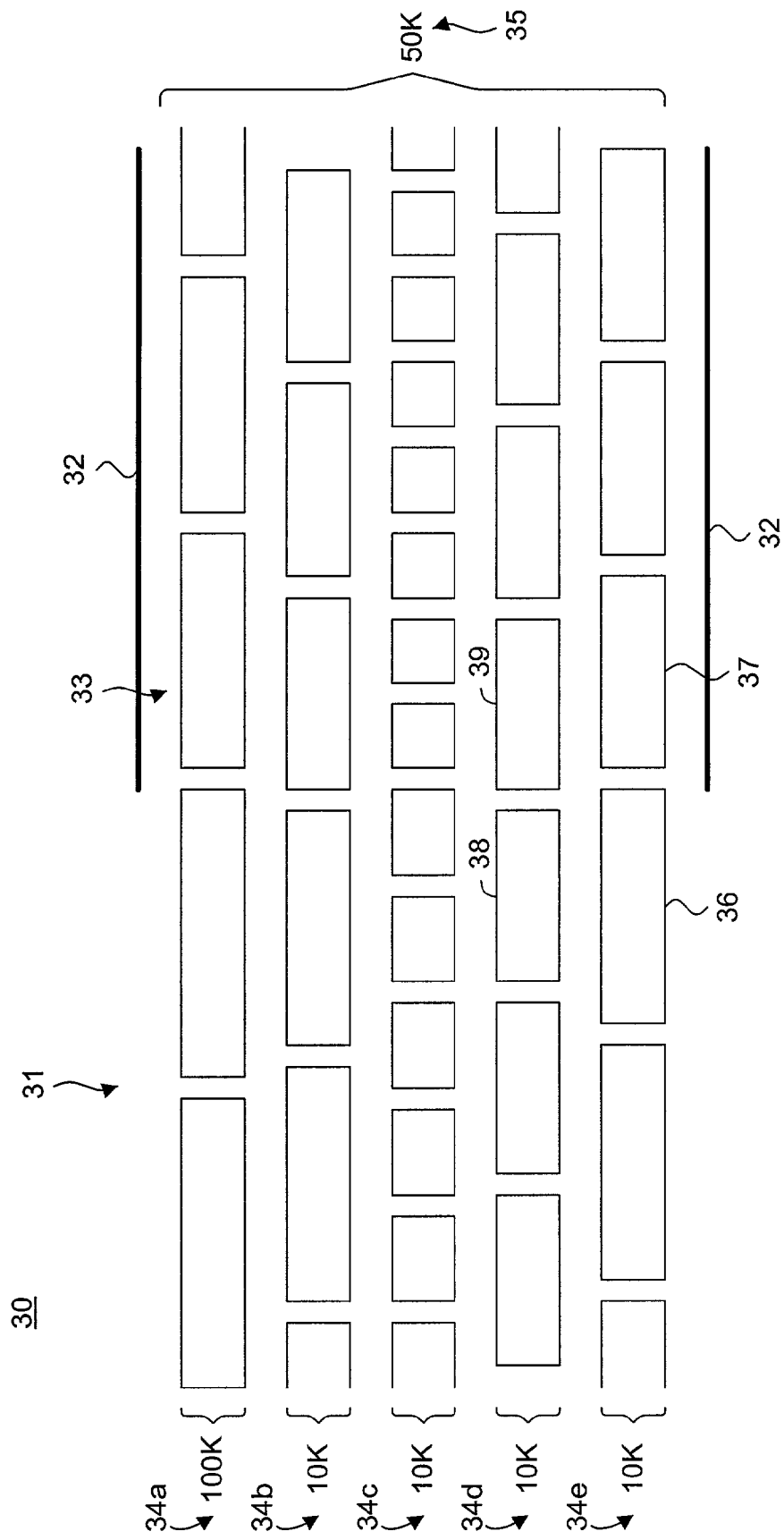
FIG. 3 is a block diagram showing, by way of example, a packet flow through a logical data tunnel.

FIG. 3 is a block diagram showing, by way of example, a packet flow 30 through a logical data tunnel 32. The logical data tunnel 32 is formed by selecting and logically combining one or more packet flows 31. Each individual packet flow 31 is controlled on an aggregate basis through bandwidth limiting and on a per-flow basis through rate limiting with data compression and queuing.

Bandwidth limiting allows the prioritization of aggregate collections of logically grouped packet flows 31 and is performed on the compressed sizes of packets flowing through the logical data tunnel 32, as further described below with reference to FIG. 4. The data type and compressed packet sizes of each packet flow 31 are analyzed prior to entering 33 the logical data tunnel 32 and a bandwidth limit 35, such as 50 Kilobaud (KBaud), is assigned.

Rate limiting is performed on the uncompressed sizes of packets in each packet flow 31. Each packet flow 31 has an actual bandwidth requirement 34a-e for an uncompressed state. In the described example, the cumulative bandwidth requirements 34a-e of the uncompressed set of packet flows 31 equals 140 Kbaud. A bandwidth limit 35 of 50 Kbaud requires at least a 3:1 data compression ratio. As necessary, individual uncompressed packets 36 are compressed into compressed packets 37. To optimize the throughput, the individual data flows 31 are compressed based on respective service types, as further described below with reference to FIG. 5. Alternatively, the uncompressed packets 38 can remain as uncompressed packets 39 within the logical data tunnel 32 for certain network protocols, such as the Hypertext Transport Protocol (HTTP) "Zip" transfers. Data that is already compressed does not compress efficiently.

Figure 4:
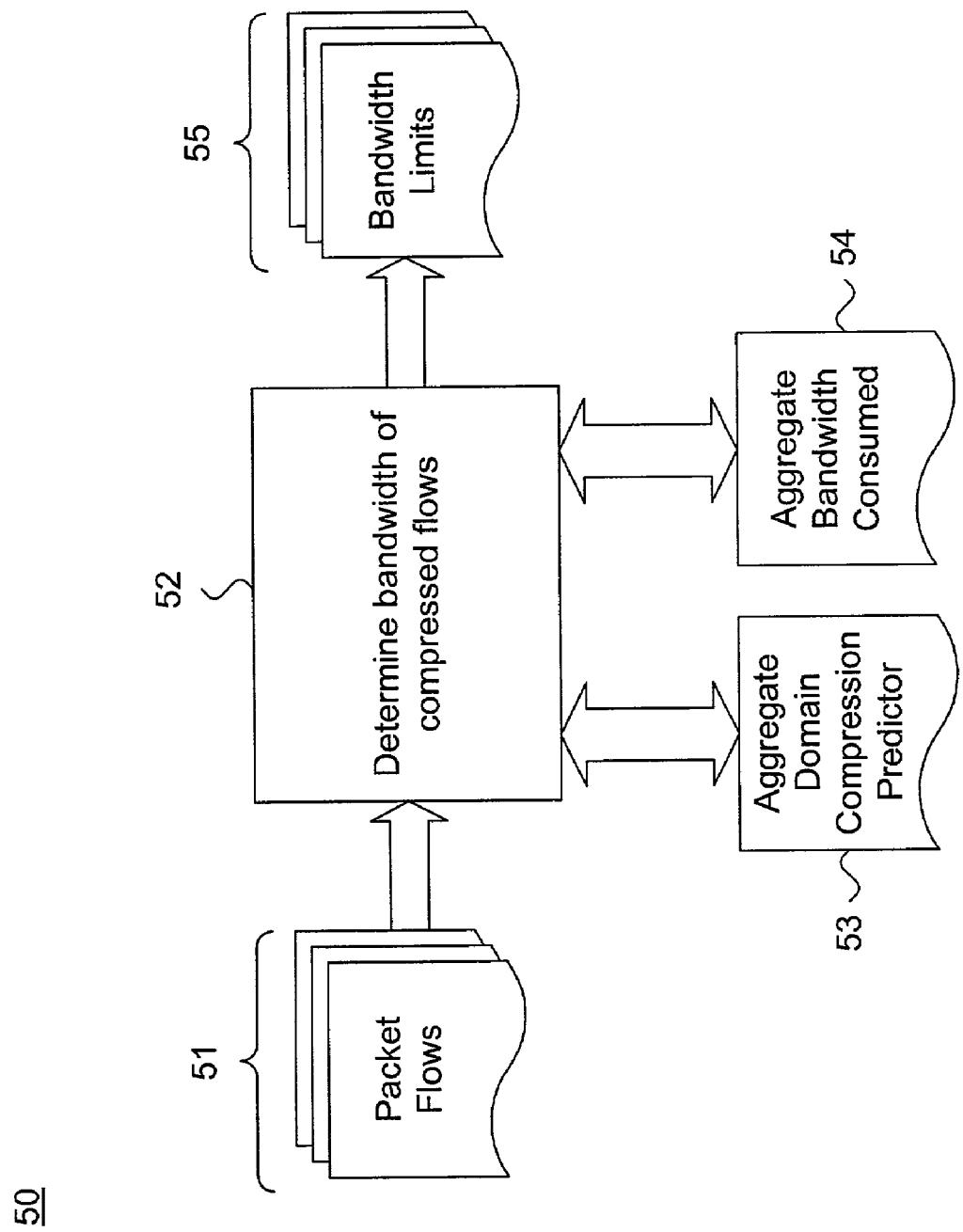
FIG. 4 is a process flow diagram showing the operations performed to control a logical data tunnel.

FIG. 4 is a process flow diagram showing the operations 50 performed to control a logical data tunnel 32 (shown in FIG. 3). The traffic manager 13 performs flow control over the aggregate set of packet flows 51 composing the logical data tunnel 32 based upon compressed packet sizes (operation 52). A set of bandwidth limits 55 is assigned to each aggregate group of packet flows 51. The traffic manager 13 calculates an aggregate domain compression prediction 53 and the aggregate bandwidth consumed 54 by the compressed packet flows 51 for use in traffic flow management.

Figure 5:
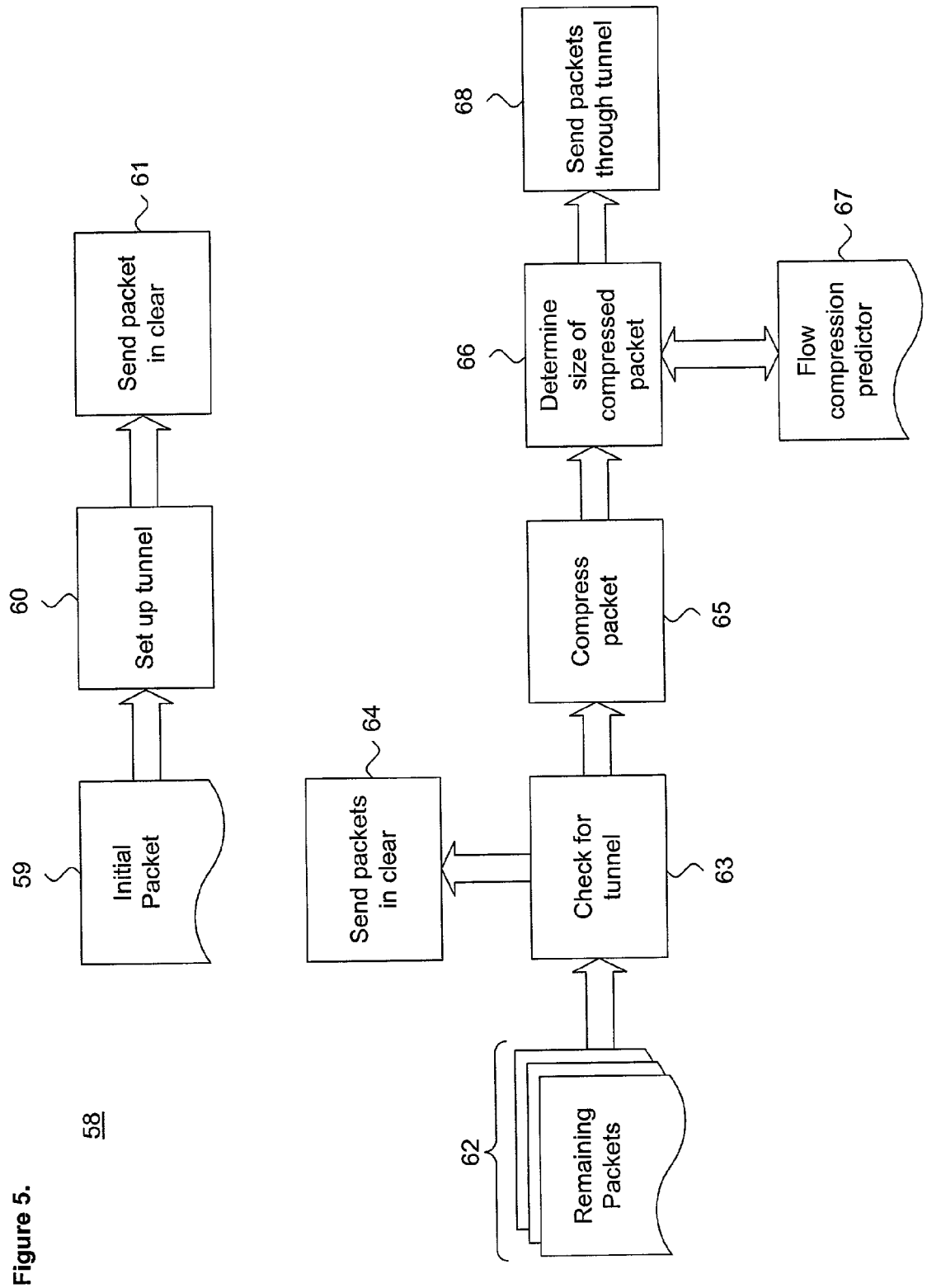
FIG. 5 is a process flow diagram showing the operations performed to control an individual packet flow through a logical data tunnel.

FIG. 5 is a process flow diagram showing the operations 60 performed to control a logical data tunnel 32 (shown in FIG. 3). A logical data tunnel is set up (operation 60) upon receipt of an initial packet 59, which is sent in the clear (operation 61). Subsequently, if the logical data tunnel is still not set up after checking (operation 63), the remaining uncompressed packets 62 continue to be sent in the clear (operation 64). However, once the logical data tunnel has been established, the remaining uncompressed packets 62 in the packet flow 51 are compressed (operation 65), as necessary. The size of each compressed packet is determined (operation 66) along with a flow compression predictor 67. The compressed packets are then sent through the logical data tunnel (operation 68). The flow compression predictor 67 is used in rate control management on a per-flow basis.

Figure 6:
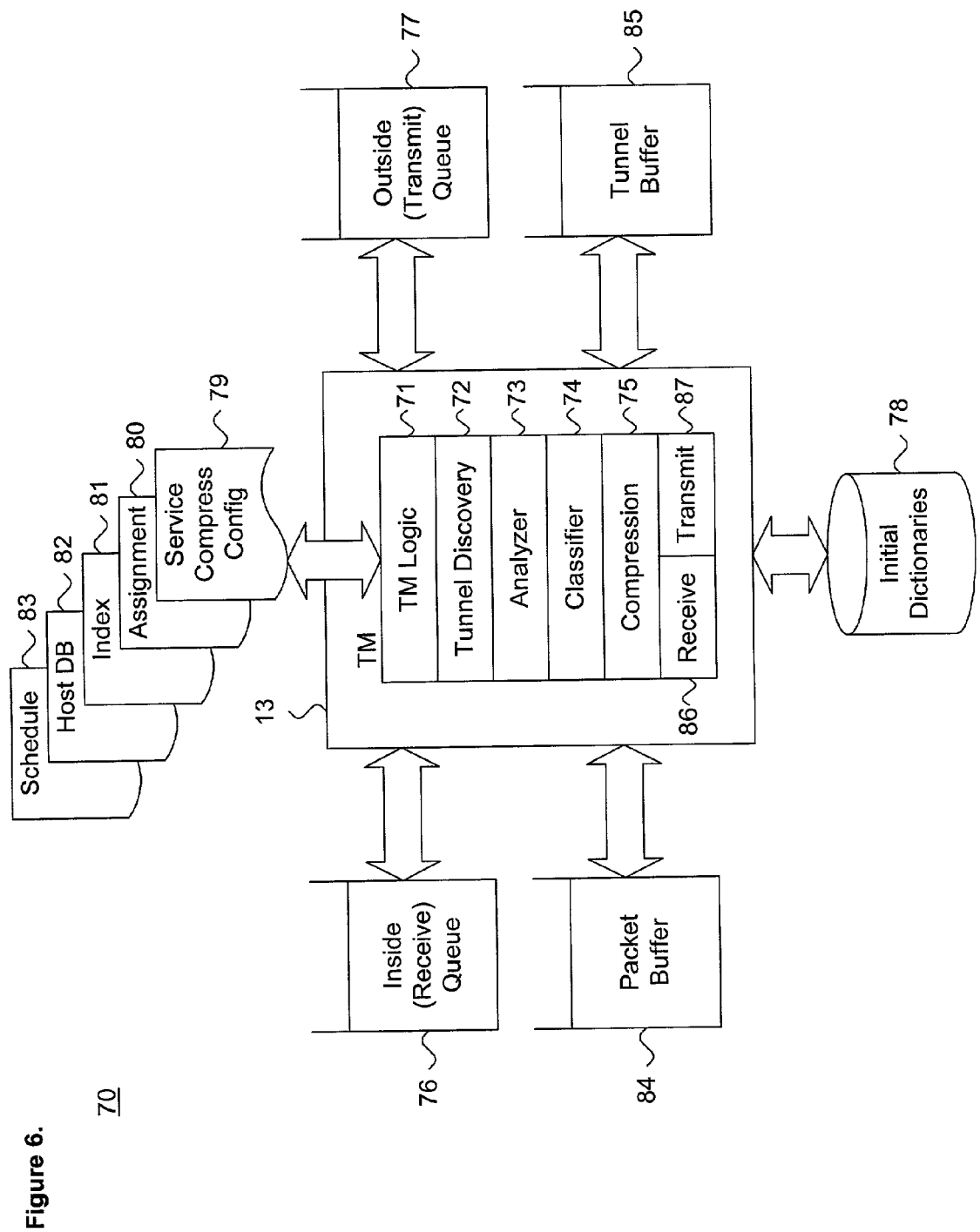
FIG. 6 is a block diagram showing the software modules of the system of FIG. 1.

FIG. 6 is a block diagram showing the software modules 70 of the system of FIG. 1. The system is implemented within the traffic manager 13 (shown in FIG. 1) and works in conjunction with basic traffic manager logic 71. The traffic manager 13 intercepts all network traffic to provide dynamic control over aggregate and individual packet flow characteristics. The traffic manager 13 includes the following modules: tunnel discovery 72, analyzer 73, classifier 74, and compression 75. The tunnel discovery module 72 determines the existence and identity of tunnel "partners" located remotely over the network. A tunnel partner is a peer traffic manager 13 providing cooperative control flow management as a receiving endpoint of a logical data tunnel 32. Tunnel discovery is described in commonly-assigned, U.S. patent application Ser. No. 10/015,826, filed Dec. 10, 2001, pending, the disclosure of which is incorporated by reference.

The analyzer module 73 analyzes packets transiting the traffic manager 13. The analyzer 73 inspects the destination address of each transient packet as queued into an inside (receive) packet queue 76 managed by a receive module 86. The inside packet queue 76 stages packets being received from and forwarded to an internal network domain.

The classifier module 74 classifies each transient packet by service type. Once classified, the transient packet is compressed by the compression module 75 based on the service type. A library of compression functions (not shown) is available to allow different compression function assignments on a per-flow, per-service and multiple shared-service basis. The compressed transient packets are queued into an outside (transmit) packet queue 77 managed by a transmit module 87. The outside packet queue 77 stages packets being received from and forwarded to an external network domain via the logical data tunnel 32.

The classifier module 74 classifies transient packets using a service compression configuration table 79. In the described embodiment, the compression function can be specified internally by the traffic manager 13, or as part of a user-supplied policy for specific service types. Table 1 shows, by way of example, a service compression configuration table 79:

TABLE 1

Service Compression Configuration.

| Service Type | Compression Algorithm | Aggregate Type | Starting Dictionary Template | Policy |
|---|---|---|---|---|
| S1 | C1 | PF | C1/1 | P1 |
| S2 | C1 | A0 | C1/2 | P2 |
| S3 | C2 | A1 | C2/1 | P2 |
| S4 | C2 | A1 | C2/1 | P3 |
| S5 | C1 | A2 | C1/3 | P4 |
| S6 | C1 | A2 | C1/3 | P4 |
| S7-a | C1 | A2 | C1/3 | P5 |
| S7-b | C3 | PF | C3/1 | P5 |
| S7-c | C1 | A0 | C1/1 | P5 |
| S8 | None | N/A | | P6 |

Table 1 maps a classification service type to data compression function configuration. S1 through S8 represent service types. C1 through C3 represent data compression functions. Each compression type can have one or more starting dictionary, represented by Cx/n, where Cx is the compression function and n is the starting dictionary reference.

Aggregate type classifications are used to determine the compression function to use when encoding and decoding packet flows. There are three types of aggregate type classifications: per-flow (PF), per-service (A0) and multiple shared-service basis (A1 and A2). Per-flow aggregate type classifications use a unique data set and starting dictionary. Per-service aggregate type classifications share a common data set and starting dictionary for a particular service type. Shared aggregate type classifications share a common data set and starting dictionary for several service types. However, any one aggregate type classification can only have one assigned compression function and starting dictionary.

For completeness, network policies P1-P6 are assigned to the various service types. However, the assignment of network policies to service types is orthogonal to the type of compression function employed.

Once the classifier 74 determines the service type, the compression module 75 selects the appropriate compression function and determines the compression data reference and initial dictionary reference using a flow reference assignment table 80. The initial dictionaries 78 are used by the compression functions. Table 2 shows, by way of example, a flow reference assignment table 80:

TABLE 2

Flow Reference Assignment Description.

| Flow ID | Service Type | Compression Data Reference | Initial Dictionary Reference | Policy |
|---|---|---|---|---|
| F1 | S1 | C1, 1 | C1/1 | P1 |
| F2 | S1 | C1, 2 | C1/1 | P1 |
| F3 | S1 | C1, 3 | C1/1 | P1 |
| F4 | S2 | C1, 4 | C1/2 | P2 |
| F5 | S2 | C1, 4 | C1/2 | P2 |
| F6 | S3 | C2, 1 | C2/1 | P2 |
| F7 | S4 | C2, 1 | C2/1 | P3 |
| F8 | S6 | C1, 5 | C1/3 | P4 |
| F9 | S7-a | C1, 5 | C1/3 | P5 |
| F10 | S7-b | C3, 1 | C3/1 | P5 |
| F11 | S7-c | C1, 6 | C1/1 | P5 |
| F12 | S8 | N/A | | |

Table 2 maps packet flows to reference identifier assignments using entries in the service compression configuration table, Table 1. The initial dictionary reference identifier identifies the starting dictionary by packet flow when encoding and decoding packets in the logical data tunnel 32 (shown in FIG. 3). By way of example, flow identifiers F1, F2 and F3 have a service type S1 and are assigned a per-flow PF aggregate type classification. Each of these flow identifiers will be assigned a unique compression data reference for the compression function used. Flow identifiers F4 and F5 have a service type of S2 and have a per-service AO aggregate type classification. These flow identifiers will share a compression data reference. Flow identifiers F6 and F7 have different service types and have a shared A1 aggregate type classification. These flow identifiers will share a compression data reference. Flow identifiers F8 and F9 also have a shared A2 aggregate type classification and share a compression data reference. Flow identifier F10 is assigned a compression for sub-service type S7-*b*. Flow identifier F11 is assigned the next compression index for compression function C1. Flow identifier F12 represents a packet flow that is not compressed.

The traffic manager 13 also maintains an index table 81, host database 82, and transmission schedule 83, as further described below with reference to FIGS. 12, 11, and 14, respectively.

An example of a traffic manager 13 suitable for use in the present invention is the Packet Shaper product operating in conjunction with Packet Wise software, version 5.0.0, sold and licensed by Packeteer, Inc., of Cupertino, Calif. The traffic manager 13 looks at end-to-end traffic at the transport layer. However, the implementation of the current approach to identifying internal hosts can also be implemented by analyzing point-to-point traffic in the network layer, as long as the source and destination addresses of the transient packets remain visible.

Each module in the traffic manager 13 is a computer program, procedure or module written as source code in a conventional programming language, such as the C++ programming language, and is presented for execution by the CPU as object or byte code, as is known in the art. The various implementations of the source code and object and byte codes can be held on a computer-readable storage medium or embodied on a transmission medium in a carrier wave. The traffic manager 13 operates in accordance with a sequence of process steps, as further described below beginning with reference to FIGS. 8A-8B.

Figure 7:
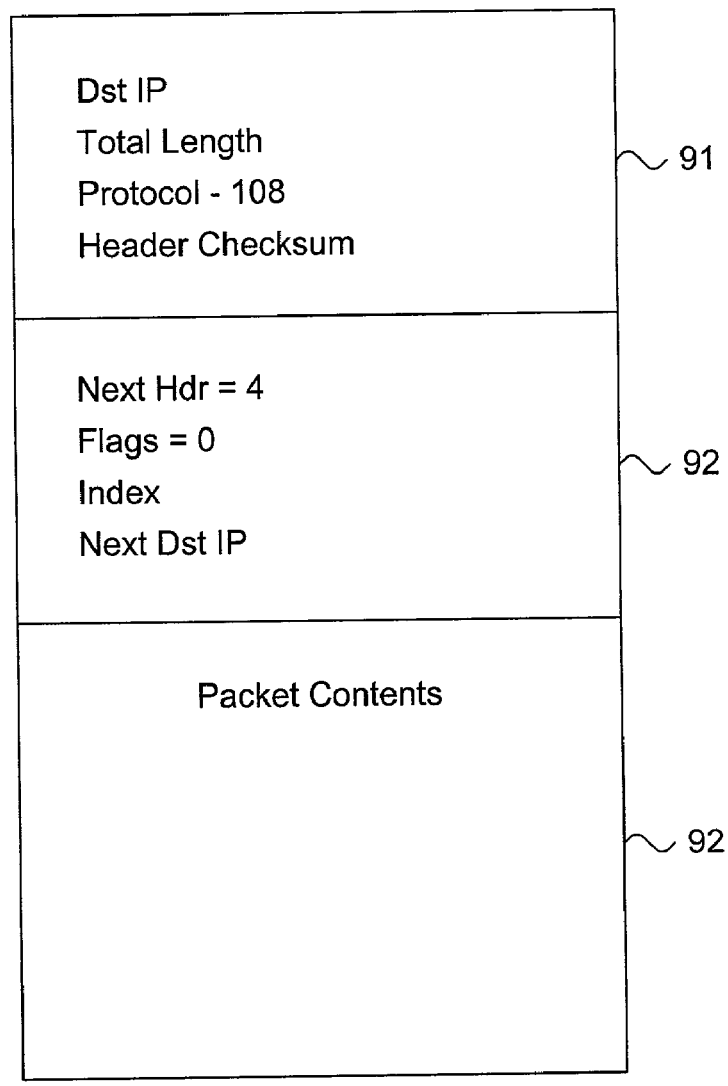
FIG. 7 is a data structure diagram showing, by way of example, an Internet Protocol (IP) packet header, an appended IPCOMP header, and packet content.

FIG. 7 is a data structure diagram 90 showing, by way of example, an Internet Protocol (IP) packet header 91, an appended IPCOMP header 92, and packet content 93. The traffic manager 13 (shown in FIG. 1) modifies the IP packet header 91 in accordance with the IP Payload Compression Protocol (IPCOMP), RFC 2393, described at http://www.faqs.org/rfcs/rfc2393.html, the disclosure of which is incorporated by reference, and as further described below with reference to FIG. 12. The IP packet header 91 fields that are modified are the destination IP address, total packet length, protocol used, and header checksum. An IPCOMP header 92 is appended after the IP packet header to specifies the next header, flags, index, and next destination IP address.

Figure 8A:
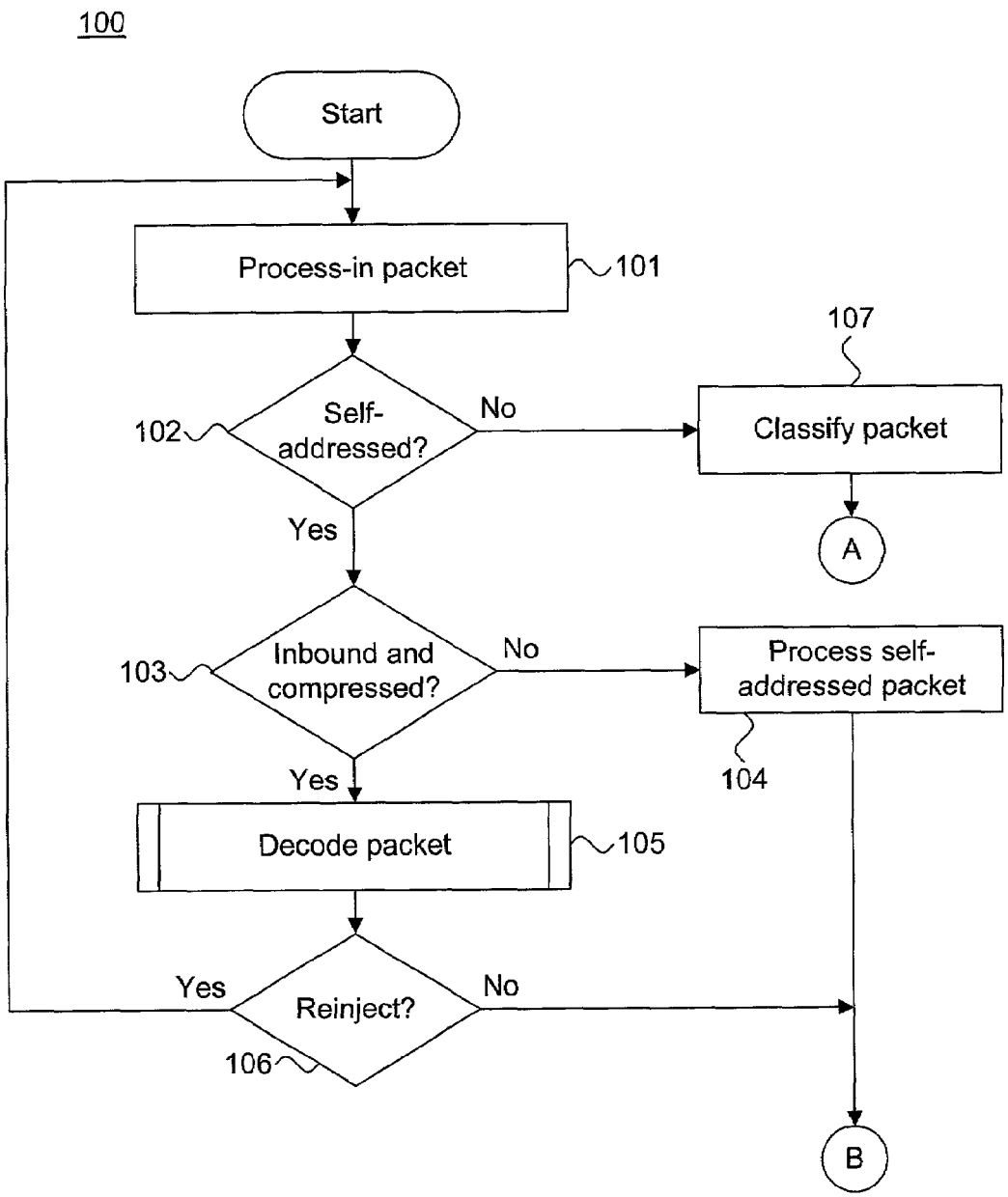
FIGS. 8A-8B are flow diagrams showing a method for dynamically controlling aggregate and individual packet flow characteristics within a compressed logical data tunnel, in accordance with the present invention.
Figure 8B:
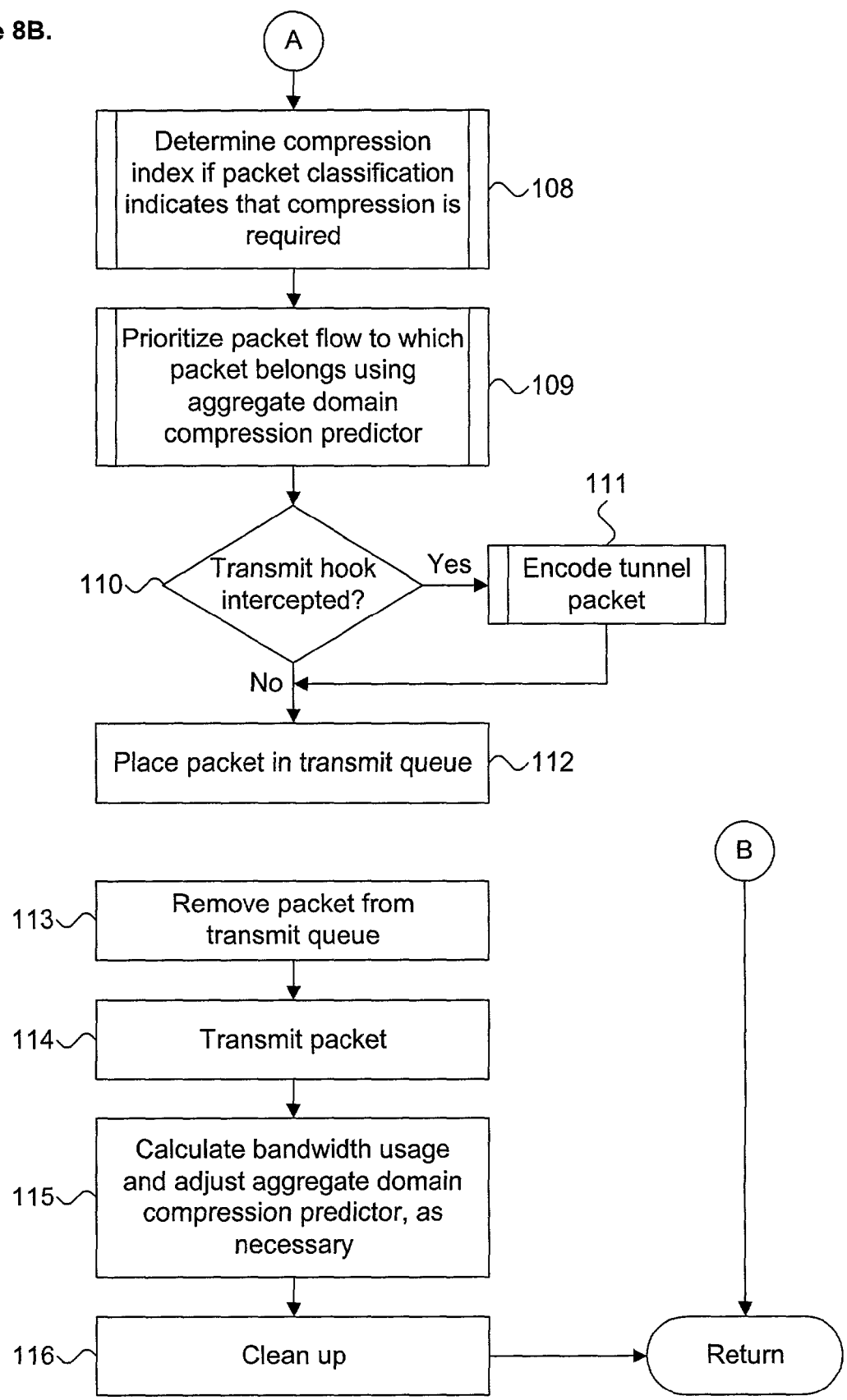

FIGS. 8A-8B are flow diagrams showing a method 100 for dynamically controlling aggregate and individual packet flow characteristics within a compressed logical data tunnel 32, in accordance with the present invention. The method classifies and prioritizes packet flows. The method also enables tunnel receive module 86 and transmit module 87 (both shown in FIG. 6) to hook into the path of each packet through the traffic manager 13.

The method proceeds in two independent concurrent phases. During the first phase (blocks 101-112), packets are processed. During the second phase (blocks 113-116), packets are transmitted.

Each packet is processed in by the traffic manager 13 (block 101). If the packet is addressed to the traffic manager 13, that is, is self-addressed (block 102), and is inbound from the logical data tunnel 32 in compressed form (block 103), the packet is decoded (block 105), as further described below with reference to FIGS. 13A-13B. If the packet is being reinjected back into the packet stream (block 106), the packet is processed-in (block 101). Otherwise, the method performs a clean up (block 116) and exits. Similarly, if the packet is addressed to the traffic manager 13 (block 102) but is not inbound from the logical data tunnel 32 in compressed form (block 103), the packet is processed by the traffic manager 13 (block 104) and the method performs a clean up (block 116) and exits.

If the packet is not addressed to the traffic manager 13 (block 102), the packet is first classified (block 107). If the packet classification indicates that compression is required, a compression index is determined (block 108), as further described below with reference to FIG. 10. The packet flow to which the packet belongs is prioritized using the aggregate domain compression predictor 53 (shown in FIG. 4) (block 109), as further described below with reference to FIG. 14. If a transmit hook is intercepted (block 110) from the transmit module 87, the packet is encoded as a tunnel packet (block 111), as further described below with reference to FIG. 9, and placed in the transmit queue 77 (shown in FIG. 6) to complete the processing phase of the method.

Processed packets are queued into the transmit queue 77 for transmission by the transmit module 87 of the traffic manager 13. Each packet is removed from the transmit queue 87 (block 113) and transmitted (block 114). The bandwidth usage is then calculated and the aggregate domain compression predictor 53 is adjusted, as necessary (block 115). The method performs a clean up (block 116) and exits to complete the transmitting phase of the method.

Figure 9:
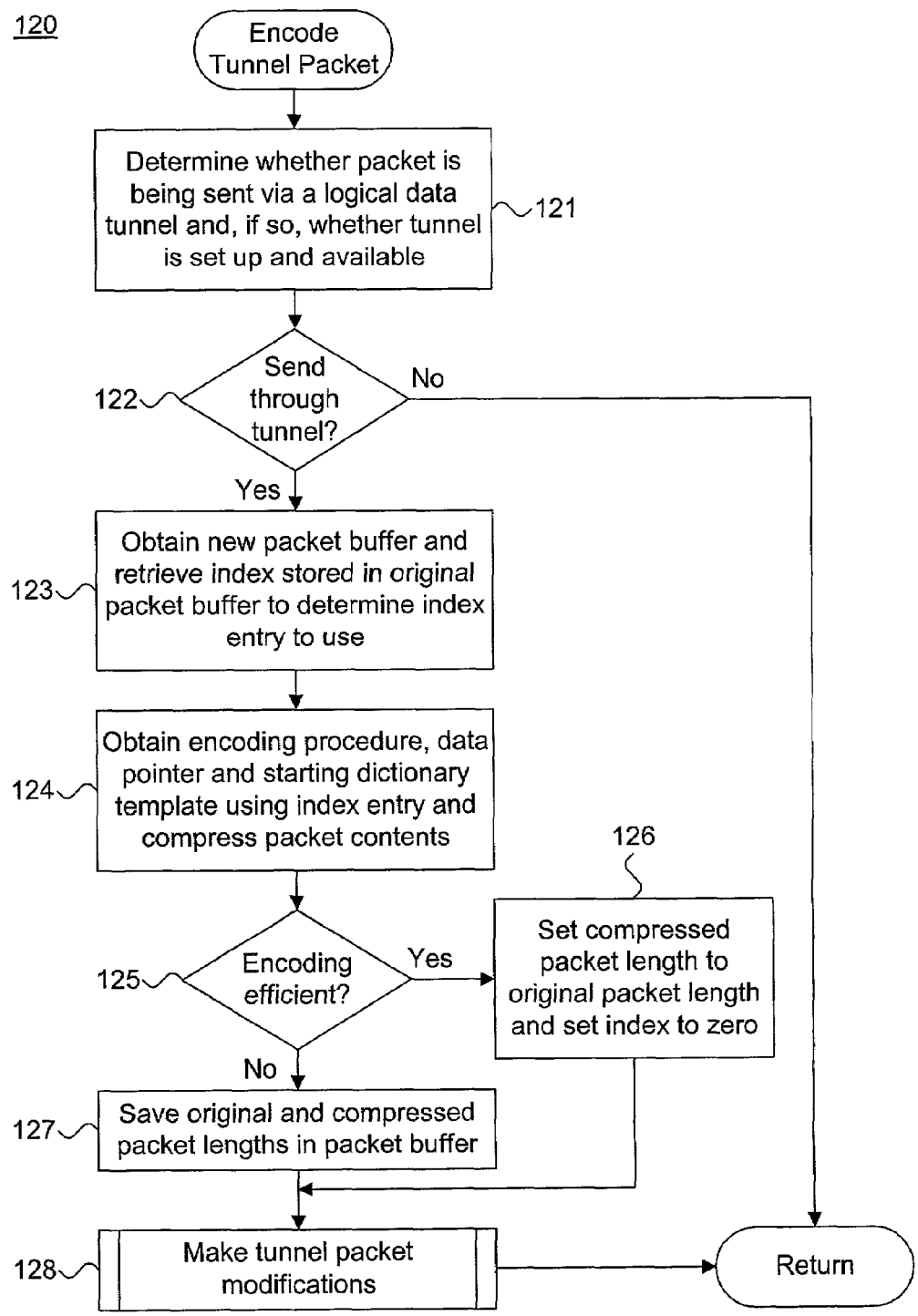
FIG. 9 is a flow diagram showing a routine for encoding a tunnel packet for use in the method of FIGS. 8A-8B.

FIG. 9 is a flow diagram showing a routine for encoding a tunnel packet for use in the method of FIGS. 8A-8B. The purpose of this routine is to encode a tunnel packet using the correct compression algorithm and initial dictionary reference based on per-flow, per-service or multiple shared-service basis aggregate type classifications.

First, the traffic manager determines whether the packet is being sent via a logical data tunnel 32 and, if so, whether the tunnel is set up and available (block 121). If the packet is not being sent through the tunnel (block 122), no encoding is necessary and the routine exits. Otherwise, a new packet buffer 84 (shown in FIG. 6) is obtained and the index stored in the original packet buffer is retrieved to determine the index entry to use (block 123). The encoding procedure, data pointer, and starting dictionary template are obtained using the index entry and the packet contents 92 (shown in FIG. 7) are compressed (block 124).

If the encoding is not efficient, that is, the encoding does not result in an appreciable decrease in packet size (block 125), the compressed packet length is set to the original packet length and the index is set to zero (block 126). Otherwise, if the encoding is efficient, the original and compressed packet lengths are saved in the packet buffer 84 (block 127) to be used later in adjusting the flow compression predictor 67 (shown in FIG. 5) and aggregate domain compression predictor 53 (shown in FIG. 4). Finally, tunnel packet modifications are made (block 128) to the IP header 91 in accordance with the IP Payload Compression Protocol (IPCOMP), RFC 2393, as further described below with reference to FIG. 12. The routine then exits.

Figure 10:
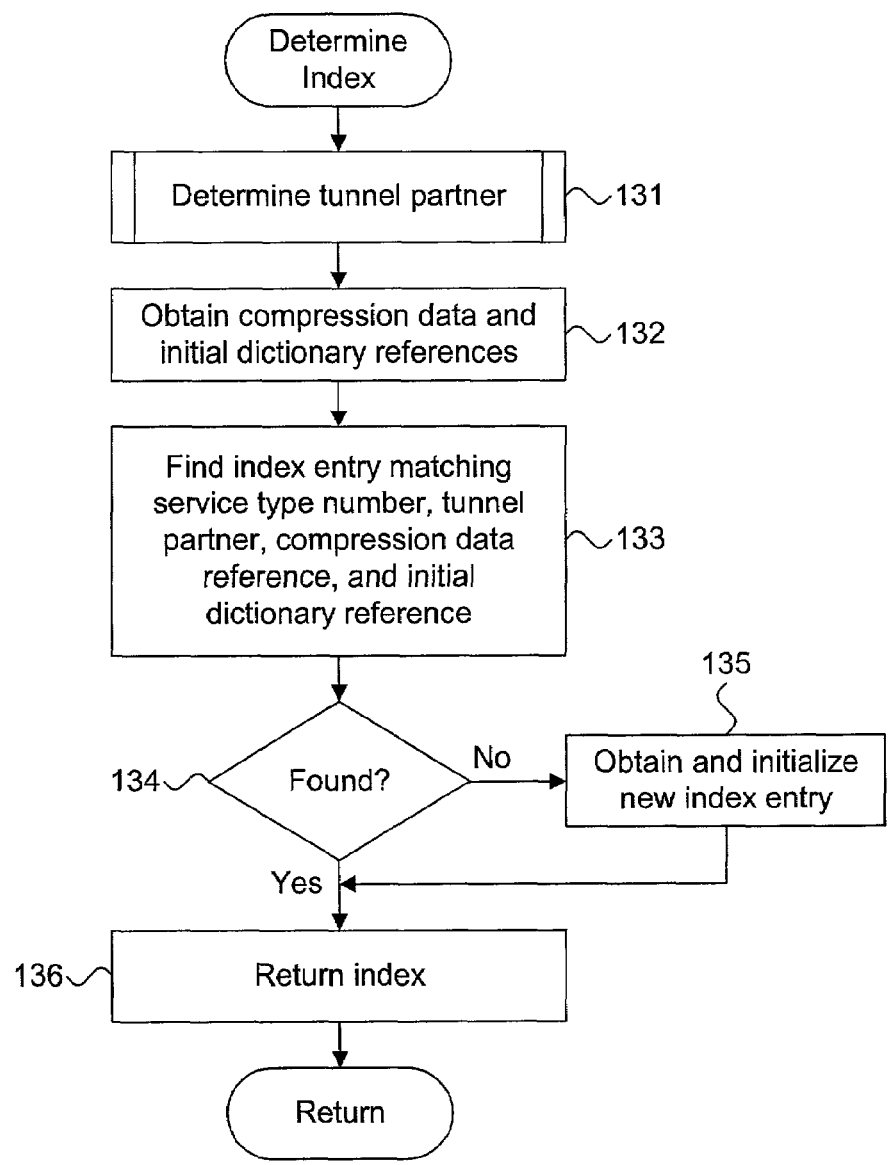
FIG. 10 is a flow diagram showing a routine for determining an index for use in the method of FIGS. 8A-8B.

FIG. 10 is a flow diagram showing a routine for determining an index for use in the method of FIGS. 8A-8B. The purpose of this routine is to find an index given a service type and packet.

First, the tunnel partner for the packet flow to which the packet belongs is determined (block 131), as further described below with reference to FIG. 11. The compression data and initial dictionary references are obtained (block 132), such as described above, by way of illustration, with reference to Table 2. The index entry matching the service type number (shown in FIG. 6), tunnel partner, compression data reference, and initial dictionary reference is found (block 133). If the index entry is not found (block 134), a new index entry is obtained and initialized (block 135). The index entry is returned (block 136) upon the exiting of the routine.

Figure 11:
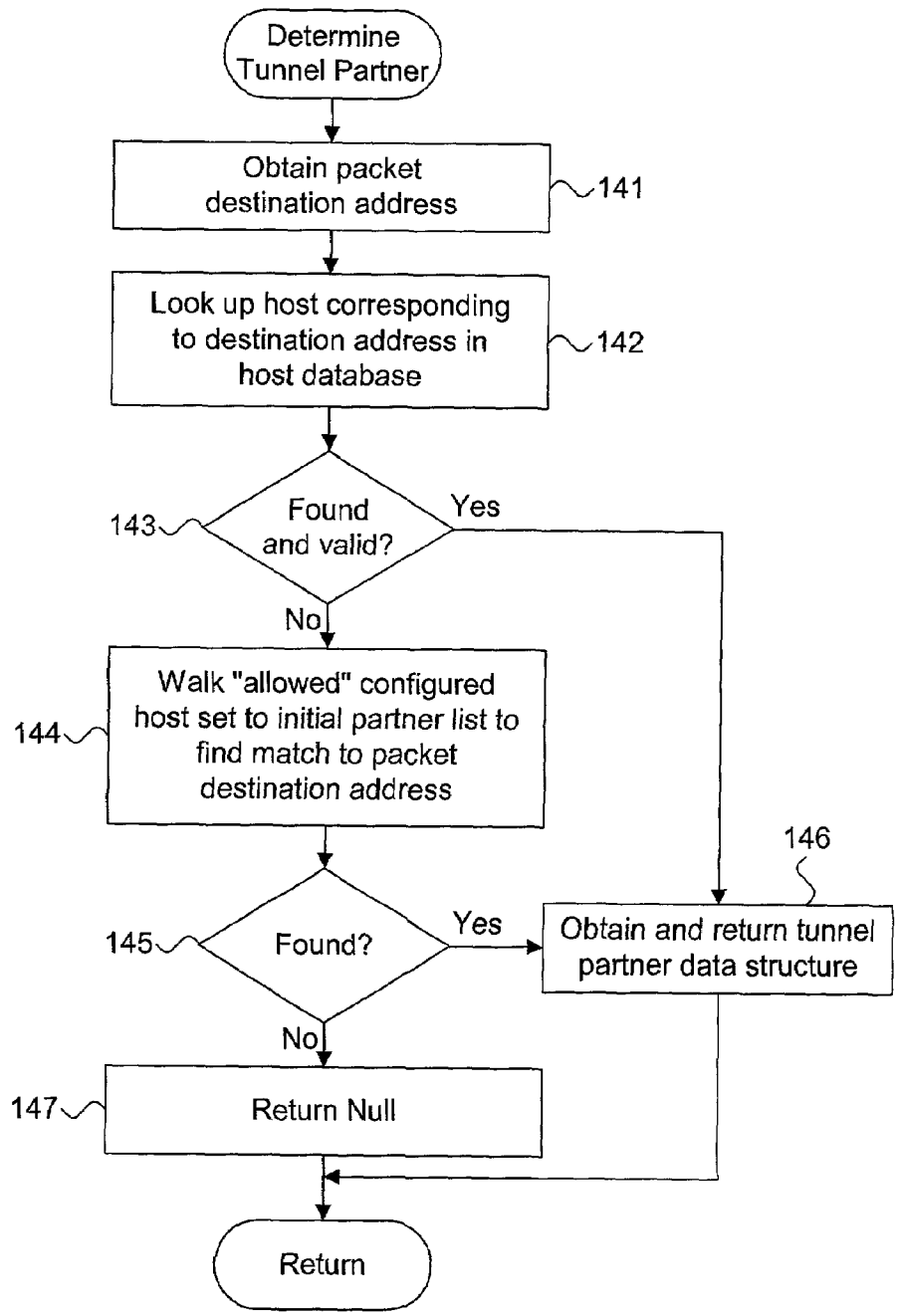
FIG. 11 is a flow diagram showing a routine for determining a tunnel partner for use in the routine of FIG. 10.

FIG. 11 is a flow diagram showing a routine for determining a tunnel partner for use in the routine of FIG. 10. The purpose of this routine is to find a tunnel partner matching the packet destination address.

The packet destination address is obtained (block 141) and the host corresponding to the destination address is looked up in a host database 82 (shown in FIG. 6) (block 142). If the host is found and is valid (block 143), the tunnel partner data structure is obtained and returned (block 146) upon the exiting of the routine. If the host is not found or is invalid (block 143), the "allowed" configured host set to initial partner list is walked to find a match to the packet destination address (block 144). If found (block 145), the tunnel partner data structure is obtained and returned (block 146) upon the exiting of the routine. Otherwise, the routine returns NULL (block 147).

Figure 12:
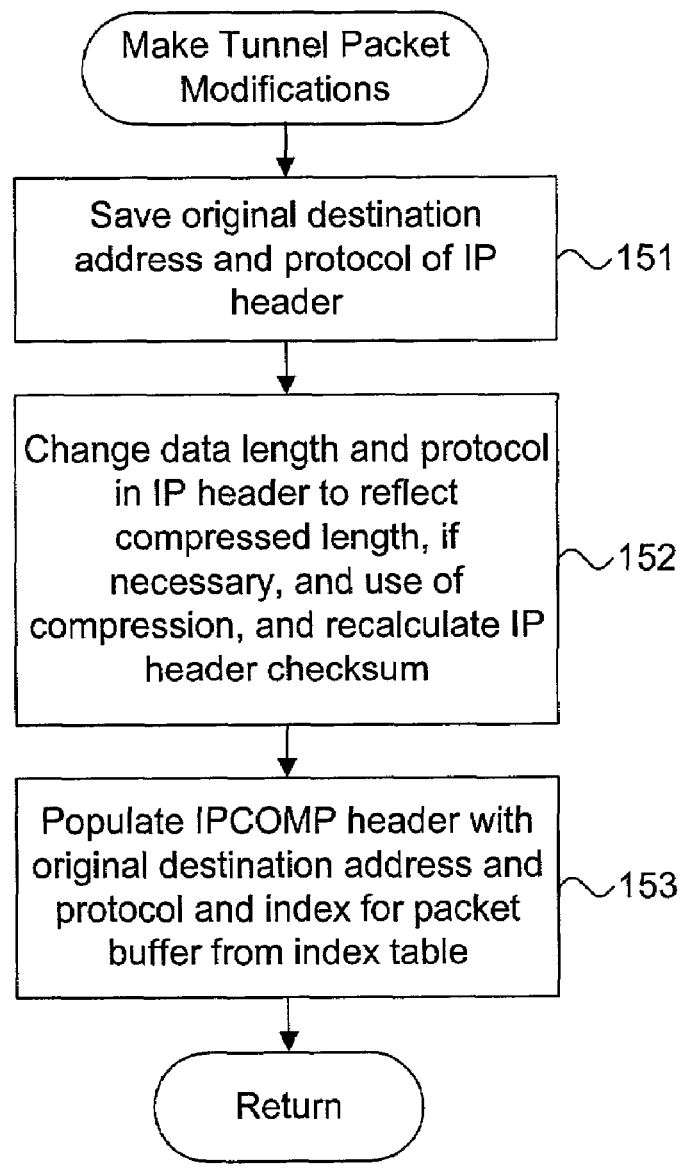
FIG. 12 is a flow diagram showing a routine for making tunnel packet modifications for use in the routine of FIG. 9.

FIG. 12 is a flow diagram showing a routine for making tunnel packet modifications for use in the routine of FIG. 9. The purpose of this routine is to modify the IP packet header 91 and to append an IPCOMP header 92 (both shown in FIG. 7) of the packet.

The original destination address and protocol of the IP header are saved (block 151). The data length and protocol in the IP header are changed to reflect the compressed length, if necessary, and use of compression, and the IP header checksum is recalculated (block 152). The IPCOMP header 92 is populated with the original destination address and protocol and the index for the packet buffer from the index table 81 (shown in FIG. 6) is filled in (block 153). The routine then exits.

Figure 13A:
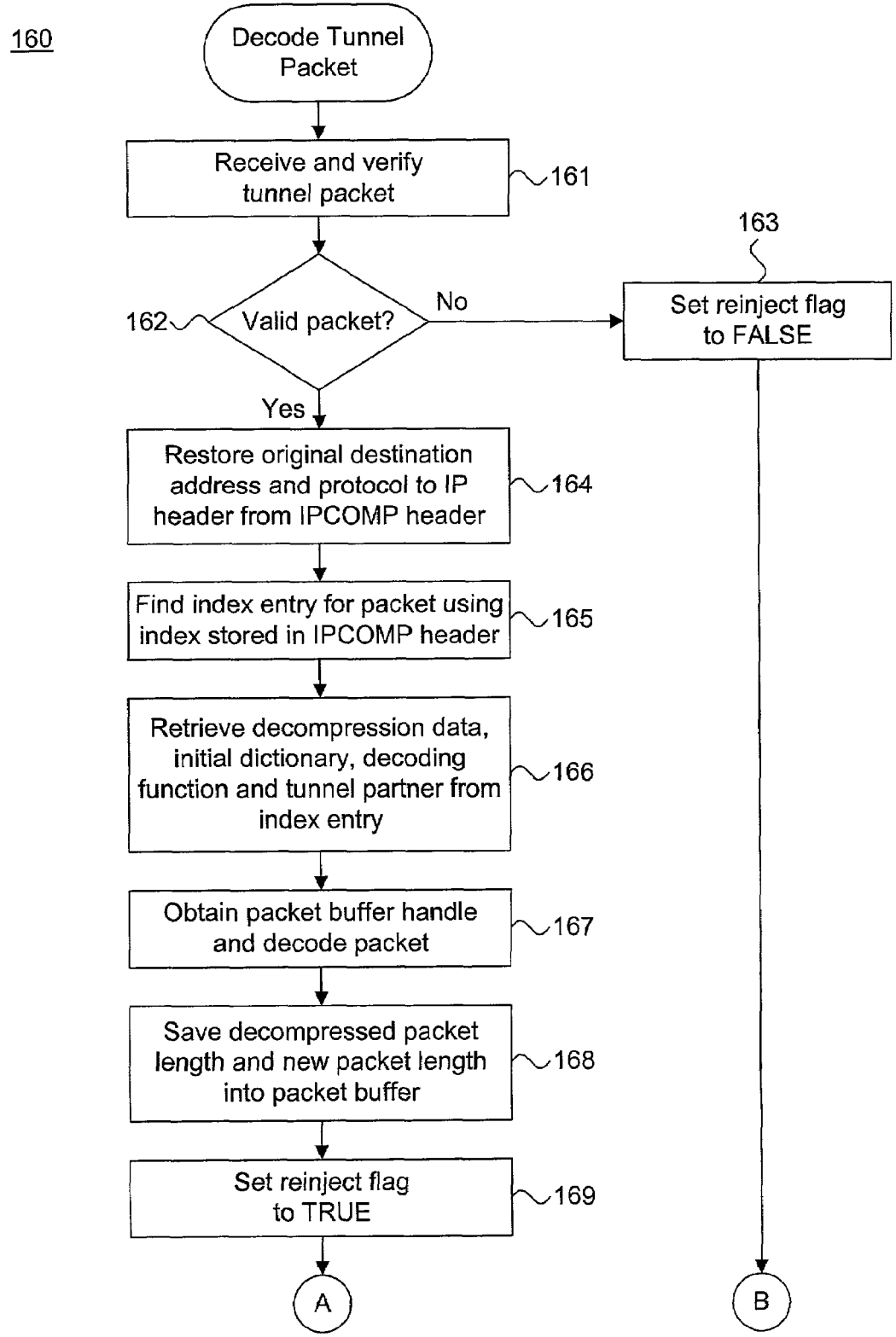
FIGS. 13A-13B are flow diagrams showing a routine for decoding a tunnel packet for use in the method of FIGS. 8A-8B.
Figure 13B:
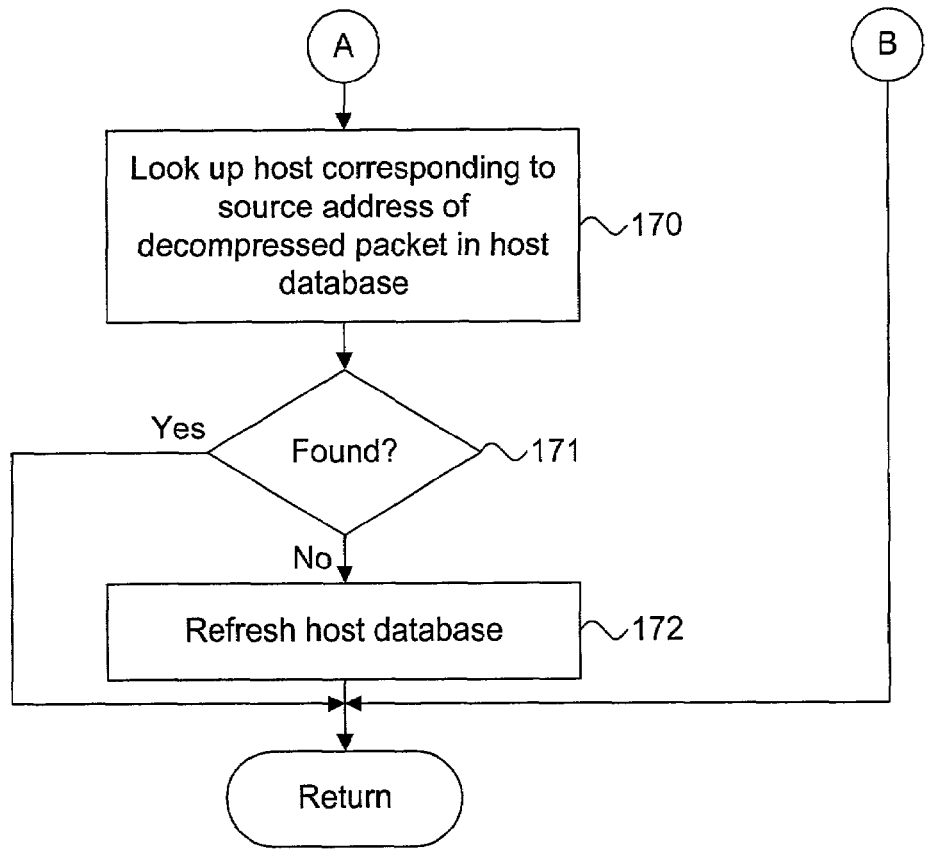

FIGS. 13A-13B are flow diagrams showing a routine for decoding a tunnel packet for use in the method of FIGS. 8A-8B. The purpose of this routine is to decode a tunnel packet using the correct compression algorithm and initial dictionary reference based on per-flow, per-service or multiple shared-service basis aggregate type classifications.

Each tunnel packet is received (block 161) and verified. If the packet is not valid (block 162), a flag indicating that the packet is to be reinjected back into the packet stream is set to FALSE (block 163) and the routine exits. Otherwise, the original destination address and protocol are restored to the IP header 91 from the IPCOMP header 92 (both shown in FIG. 7) (block 164). The index entry for the packet is found using the index stored in the IPCOMP header 92 (block 165). The decompression data, initial dictionary, decoding function, and tunnel partner are retrieved from the index entry (block 166). The packet buffer 84 (shown in FIG. 6) handle is obtained and the packet is decoded (block 167). The decompressed packet and the new packet lengths are saved into the packet buffer 87 (block 168). A flag indicating that the packet is to be reinjected back into the packet stream is set to TRUE (block 169).

The host corresponding to the source address of the decompressed packet is looked up in a host database 82 (shown in FIG. 6) (block 170). If the host is not found (block 171), the host database 82 is refreshed. The routine then exits.

Figure 14:
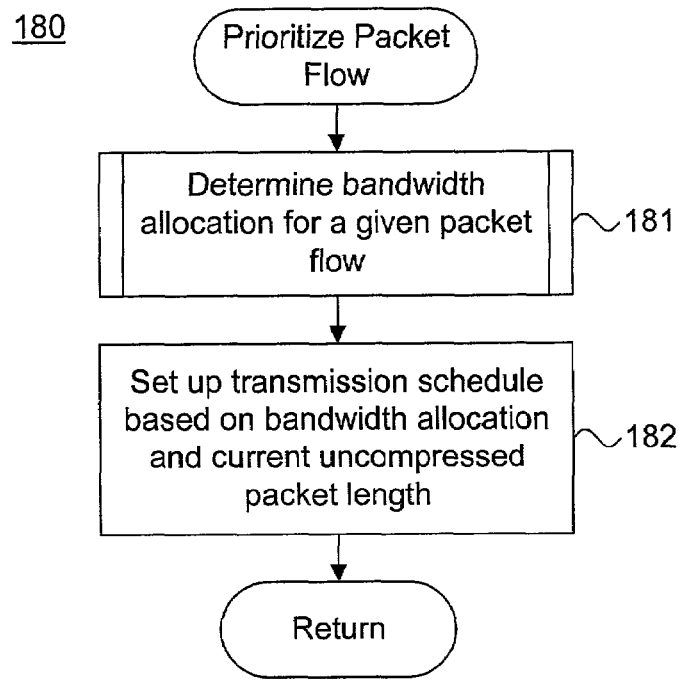
FIG. 14 is a flow diagram showing a routine for prioritizing a packet flow for use in the method of FIGS. 8A-8B.

FIG. 14 is a flow diagram showing a routine for prioritizing a packet flow for use in the method of FIGS. 8A-8B. The purpose of this routine prioritize a packet flow based on bandwidth allocation and to set up a transmission schedule 83 (shown in FIG. 6).

First, bandwidth allocation for a given packet flow is determined (block 181), as further described below with reference to FIG. 15. A transmission schedule 83 is then set up based on the bandwidth allocation and current uncompressed packet length (block 182). The routine then exits.

Figure 15:
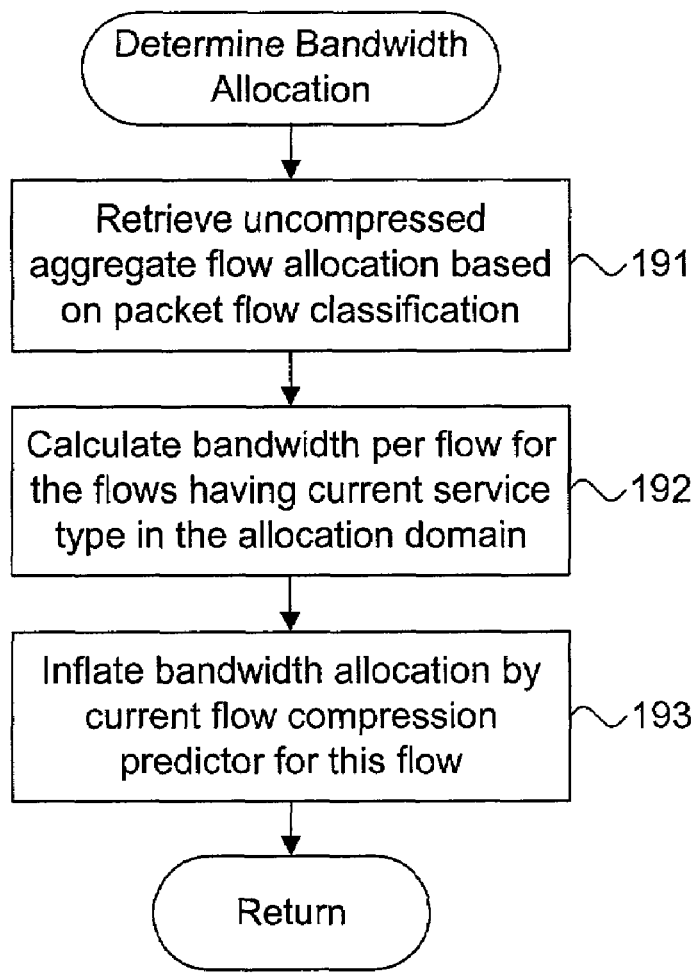
FIG. 15 is a flow diagram showing a routine for determining bandwidth allocation for use in the routine of FIG. 14.

FIG. 15 is a flow diagram showing a routine for determining bandwidth allocation for use in the routine of FIG. 14. The purpose of this routine determine bandwidth allocation by packet flow type adjusted by the flow compression predictor 67 (shown in FIG. 5).

The uncompressed aggregate flow allocation is retrieved based on the classification of the packet flow (block 191). The bandwidth per flow is calculated for the flows having the current service type in the allocation domain (block 192). The bandwidth allocation is inflated by the current flow compression predictor 67 (block 193) and the routine exits.

While the invention has been particularly shown and described as referenced to the embodiments thereof, those skilled in the art will understand that the foregoing and other changes in form and detail may be made therein without departing from the spirit and scope of the invention.

APPENDIX

```
Typedef enum{
        NO_CMPRSN                      = 0,
        LZW_CMPRSN                     = 1,
        GZIP_CMPRSN                    = 2
} COMPRSN_CODE;
typedef enum{
        AGGREGATE_NOT_SET              = 0,
        AGGREGATE_PER_FLOW             = 1,
        AGGREGATE_PER_SERVICE          = 2,
        AGGREGATE_SHARED               = 3
} COMPRSN_TYPE;
typedef UINT32 CMPRSN_DICT;
typedefvoid*  (*INIT_FUNC)(CMPRSN_DICT dict);
typedef int   (*CODING_FUNC)(void* data, IUNT8* src, int srcLen,
              UINT8* dst, int dstLen);
typedef void  (*CHKPT_FUNC)(void* data);
typedef void  (RELEASE_FUNC)(void* data, RELEASE_OPTION
              option);
typedef void  (DICT_UPD_FUNC)(void* data,
              COMPRSN_DICT_OPTION option);
typedef struct {
        char              *name;
        CMPRSN_CODE       code;
        INIT_FUNC         init;
        CODING_FUNC       encode;
        CODING_FUNC       decode;
        CHKPT_FUNC        checkpt;
        RELEASE_FUNC      release;
        CMPRSN_LEVEL      level;
} CMPRSN_CONFIG
typedef struct {
        char                      * name;
        CMPRSN AGGREGATE_TYPE     type;
        CMPRSN_CONFIG             config;
} CMPRSN_INFO   /* COMPRSN_INFO found in service table (used
                by xmit only) */
```

What is claimed is:

1. A system for dynamically controlling aggregate and individual packet flow characteristics within a compressed logical, network layer data tunnel, comprising:

a traffic manager operative to form a logical, network layer data tunnel with a remote tunnel partner, to transmit one or more packet flows via the logical, network layer data tunnel, each packet flow comprising individual packets having a destination address, by modifying the individual packets in the packet flows to identify the remote tunnel partner as the destination address, further comprising:

a classifier module operative to classify packet flows to determine respective service types, wherein each service type maps to an aggregate bandwidth flow allocation, and further maps to a compression index value;

a compression module operative to compress individual packets of the one or more packet flows, and to apply a compression algorithm to individual packets based on the compression index value associated with the individual packets;

a transmit module operative to schedule packets for transmission based on the aggregate bandwidth flow allocations of respective packet flows; and transmit individual packets compressed by the compression module over the logical, network layer data tunnel; and an evaluation module operative to adjust the aggregate bandwidth flow allocations for the respective service types based on the compressed sizes and original sizes of the individual packets.

2. A system according to claim 1, further comprising:
a decompression module operative to decompress at least one packet of a packet flow transiting within the logical, network layer data tunnel upon receipt.

3. A system according to claim 1, further comprising:
a flow index assignment description table associating a service type with each packet flow;
a library maintaining a plurality of data compression functions; and
one such data compression function applied to each packet flow within the at least one such packet stream on one of a per-flow, per-service and multiple shared-service basis.

4. A system according to claim 1, further comprising:
a partnered traffic manager associating the shared destination address of one such packet flow with a shared source address of a return packet flow comprising one or more individual packets generated responsive to the one such packet flow.

5. A system according to claim 1, wherein the logical, network layer data tunnel is formed between at least one of a terrestrial networking environment and a satellite communications environment.

6. A system according to claim 1, wherein at least one packet is compressed using one of Zip, LZW, Huffman, RLE, packet fragment caching, and Lempel-Ziv compression techniques.

7. A method for dynamically controlling aggregate and individual packet flow characteristics within a compressed logical, network layer data tunnel, comprising:

forming a logical, network layer data tunnel with a remote tunnel partner, to transmit one or more packet flows, each packet flow comprising individual packets having a destination address, by modifying the individual packets in the packet flows to identify the remote tunnel partner as the destination address;

controlling bandwidth allocated to the aggregated flow of packets routed through the logical, network layer data tunnel; and controlling transfer rate assigned to each packet flow transiting within the logical, network layer data tunnel, wherein the controlling the transfer rate comprises:

classifying packet flows to determine respective service types, wherein each service type maps to an aggregate bandwidth flow allocation and maps to a compression index value;

compressing individual packets of the one or more packet flows by applying a compression algorithm to individual packets based on the compression index value associated with the individual packets;

scheduling packets for transmission based on the aggregate bandwidth flow allocations of respective packet flows;

transmitting individual packets compressed by the compression module over the logical, network layer data tunnel; and adjusting the aggregate bandwidth flow allocation for the respective service types based on the compressed sizes and original sizes of the individual packets.

8. A method according to claim 7, further comprising:
decompressing at least one packet flow transiting within the logical, network layer data tunnel upon receipt.

9. A method according to claim 7, the applying step further comprising:
   associating a service type with each packet flow;
   maintaining a plurality of data compression functions; and
   applying one such data compression function to each packet flow within the at least one such packet stream on one of a per-flow, per-service and multiple shared-service basis.

10. A method according to claim 7, further comprising:
    associating the shared destination address of one such packet flow with a shared source address of a return packet flow comprising one or more individual packets generated responsive to the one such packet flow.

11. A method according to claim 7, wherein the logical, network layer data tunnel is formed between at least one of a terrestrial networking environment and a satellite communications environment.

12. A method according to claim 7, wherein at least one packet is compressed using one of Zip, LZW, Huffman, RLE, packet fragment caching, and Lempel-Ziv compression techniques.

13. A computer-readable storage medium holding code for performing the method according to claim 7.

* * * * *